United States Patent [19]

McGovney

[11] Patent Number: 4,569,435
[45] Date of Patent: Feb. 11, 1986

[54] POWER-DRIVEN CONVEYOR

[75] Inventor: William E. McGovney, Kansas City, Mo.

[73] Assignee: House of Lloyd, Inc., Grandview, Mo.

[21] Appl. No.: 523,344

[22] Filed: Aug. 15, 1983

[51] Int. Cl.$^4$ ............................................. B65G 43/00
[52] U.S. Cl. .................. 198/502.1; 198/810; 198/832; 198/859
[58] Field of Search ............... 198/855, 858, 859, 810, 198/832, 503, 502, 833, 813

[56] References Cited

U.S. PATENT DOCUMENTS

| | | |
|---|---|---|
| 1,208,067 | 12/1916 | Williams . |
| 1,547,276 | 7/1925 | Wentz ................................ 198/699 |
| 1,934,835 | 11/1933 | Weiss ................................. 198/859 |
| 2,133,481 | 10/1938 | Schroeder ......................... 198/859 |
| 2,781,945 | 2/1957 | Skold ................................ 198/859 |
| 3,011,621 | 12/1961 | Byrnes et al. . |
| 3,082,859 | 3/1963 | Hagner et al. ..................... 198/859 |
| 3,105,601 | 10/1963 | Small . |
| 3,191,747 | 6/1965 | Pollard . |
| 3,252,595 | 5/1966 | Collins et al. . |
| 3,306,218 | 2/1967 | Reeves ............................... 198/688 |
| 3,450,249 | 6/1969 | Poll .................................... 198/503 |
| 3,507,406 | 4/1970 | Zollinger . |
| 3,721,331 | 3/1973 | Holbrook et al. . |
| 3,880,298 | 4/1975 | Habegger et al. . |
| 3,954,190 | 5/1976 | Howard et al. . |
| 4,018,328 | 4/1977 | Galarowic et al. ................. 198/859 |
| 4,020,945 | 5/1977 | Takeno et al. ..................... 198/810 |
| 4,130,193 | 12/1978 | Bourgeois . |
| 4,133,436 | 1/1979 | Dahm . |

Primary Examiner—Joseph E. Valenza
Attorney, Agent, or Firm—Litman, Day and McMahon

[57] ABSTRACT

A power-driven conveyor which includes a bed with opposite front and back ends, front and back pulleys extending transversely across the bed ends, and an endless belt trained over the pulleys. A plurality of cleats are attached to the belt in spaced relation and extend transversely thereacross. A drive mechanism for the conveyor includes an actuator with an extensible and retractable rod and a pawl mechanism connected to the rod. The pawl mechanism has a push configuration in engagement with one of the cleats for advancing the conveyor belt and a retract configuration disengaged from the cleats. The conveyor is cycled and monitored by a control system.

26 Claims, 12 Drawing Figures

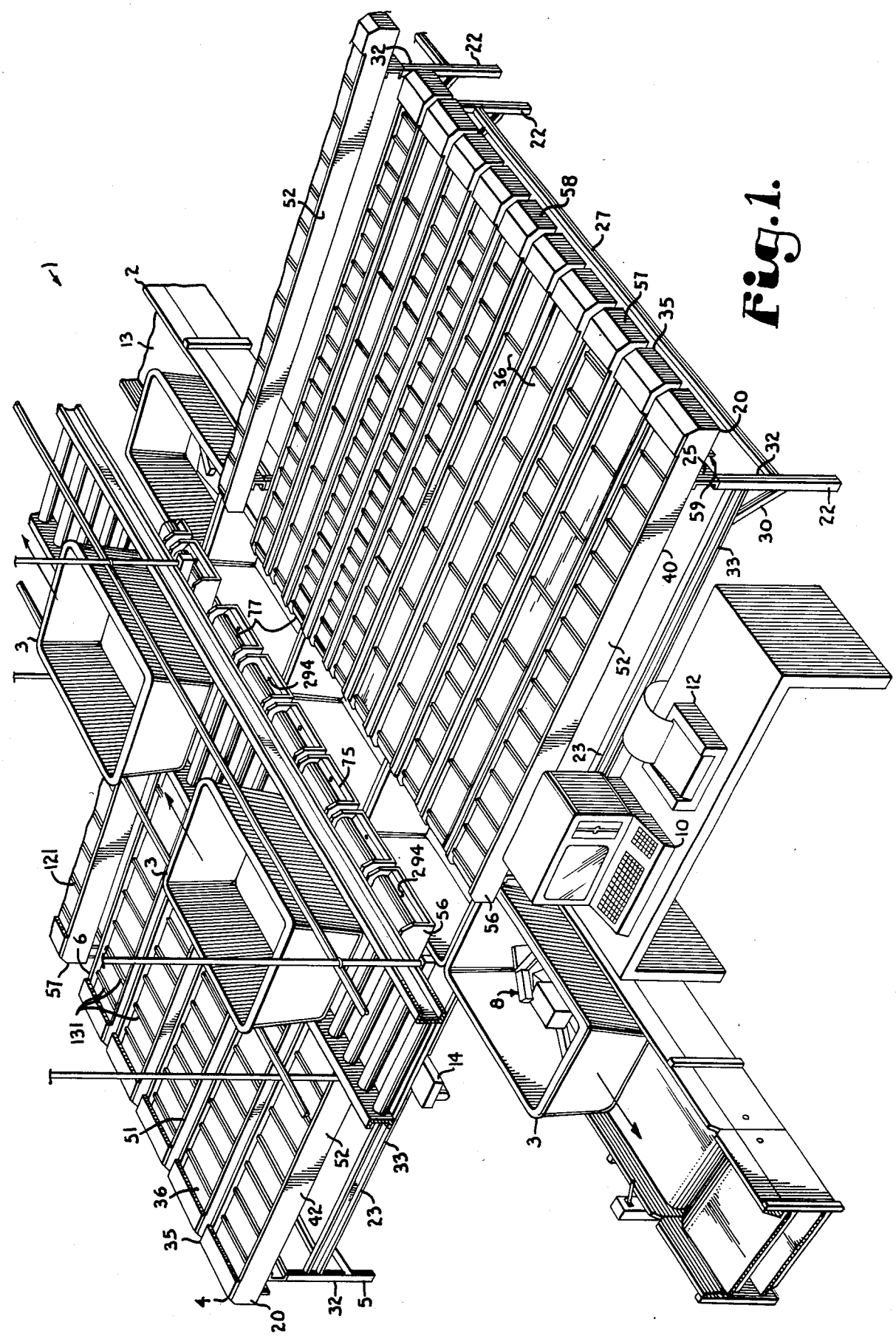

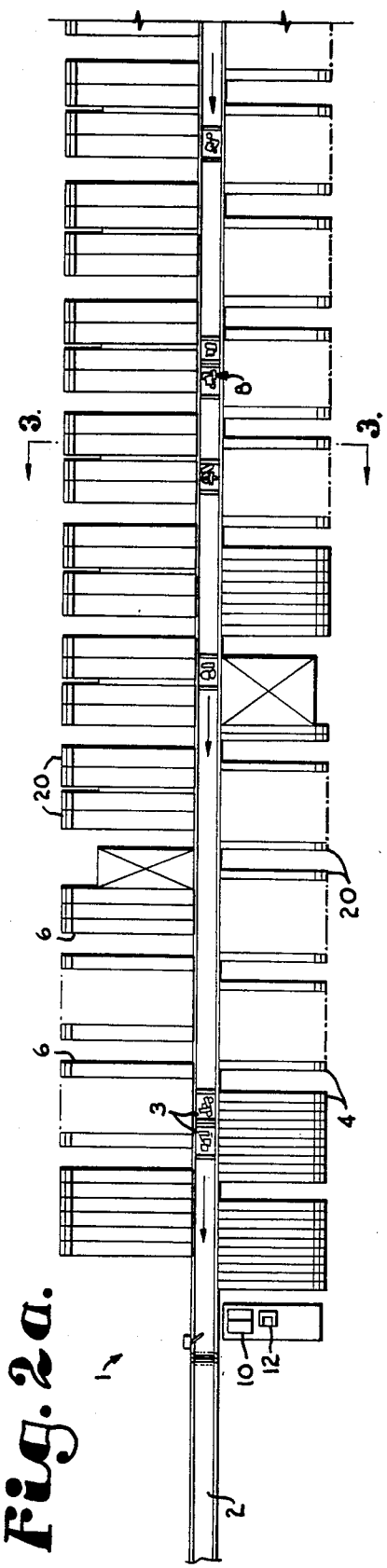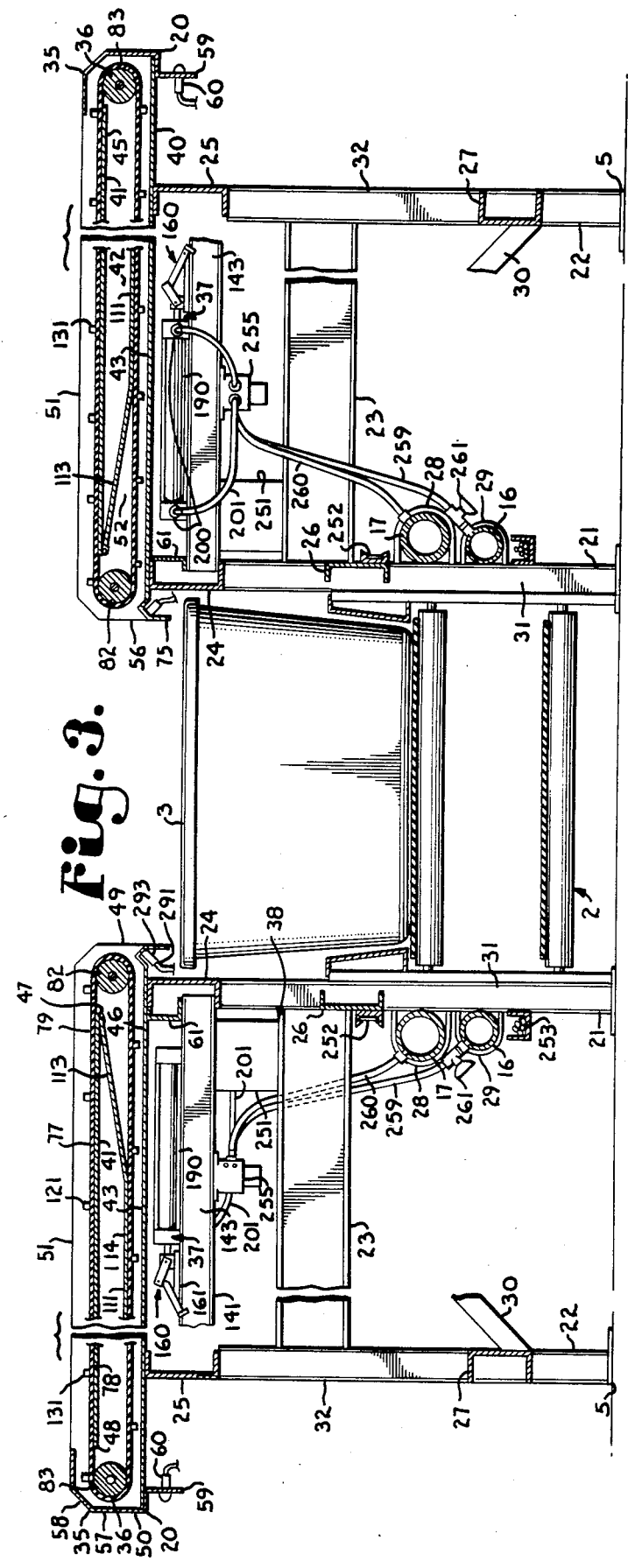

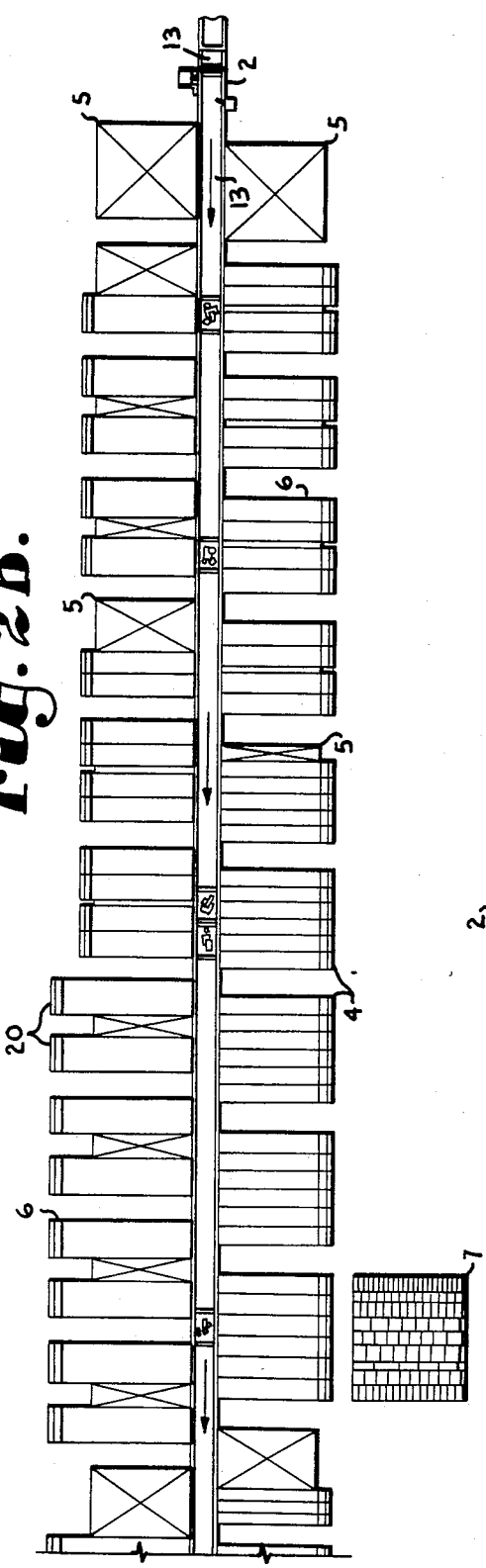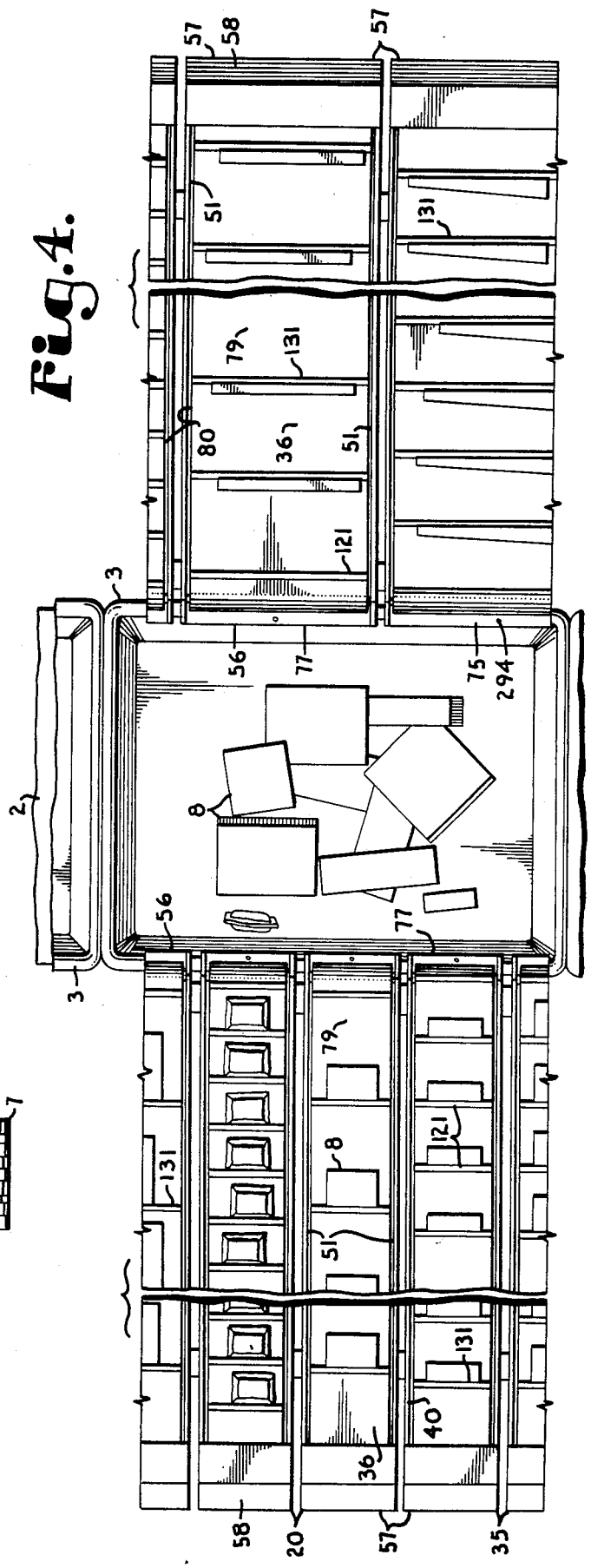

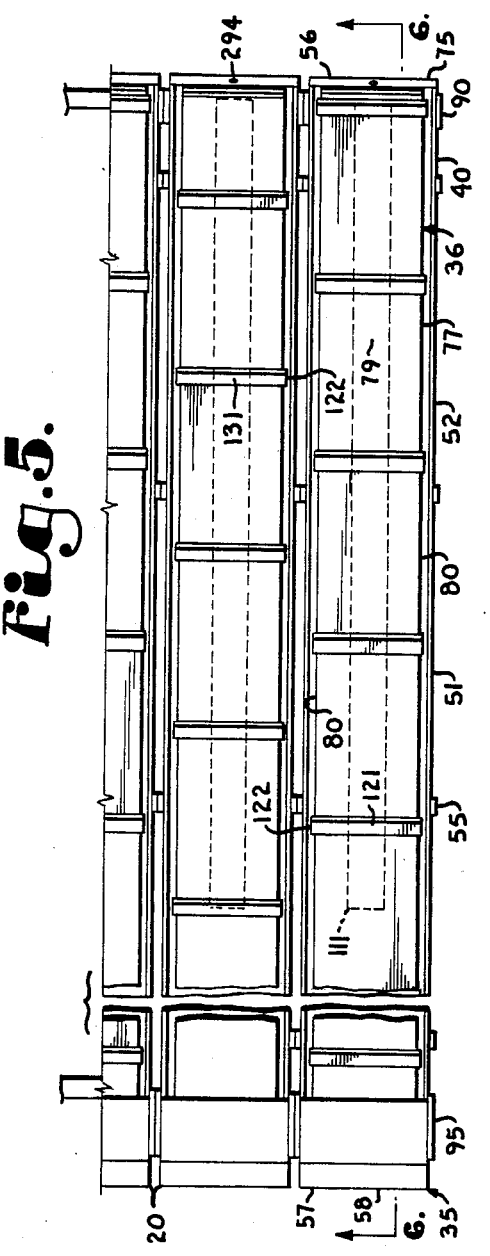

U.S. Patent  Feb. 11, 1986  Sheet 5 of 5  4,569,435
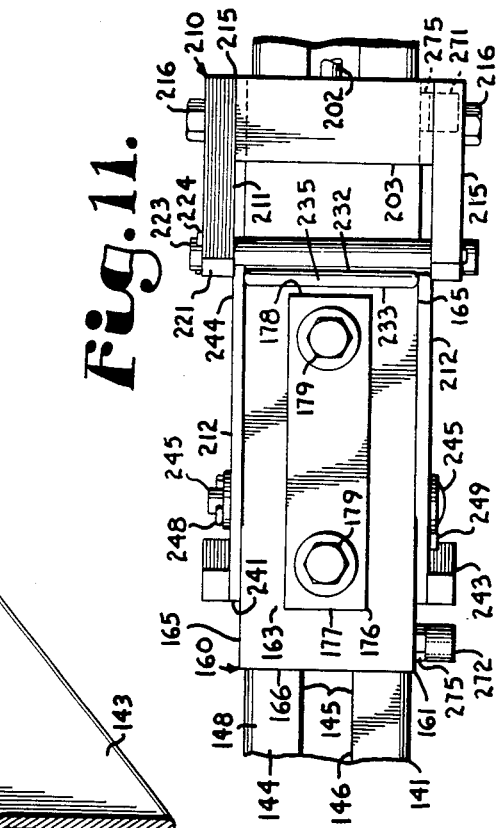
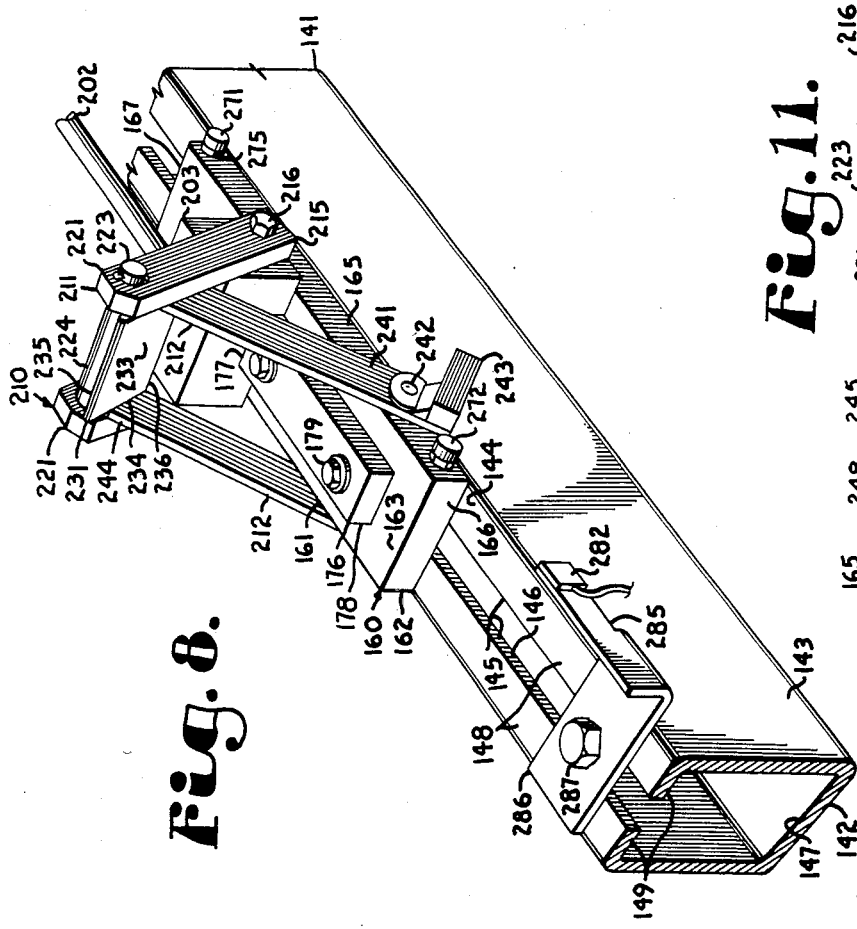

POWER-DRIVEN CONVEYOR

BACKGROUND OF THE INVENTION

1. Field of the Invention

The present invention relates to the field of conveyors in general, and in particular to a power-driven conveyor with an endless belt driven by a pneumatic cylinder and a pawl mechanism.

2. Description of the Prior Art

A variety of different types of power-driven or live conveyors have heretofore been developed. Such conveyors include driven members and drive mechanisms. For example, the driven members include rollers, chains and belts. Drive mechanisms for live conveyors include various kinds of motors operably connected to the driven members.

In operation, power-driven or live conveyors may run continuously or, alternatively, their driven members may move incrementally in response to commands from a control system. Such incremental driven member movements in the latter type of power-driven conveyor may be accomplished by means of, for example, stepper motors.

Stepper motors rotate in short and substantially uniform angular movements or steps. Typical steps comprise thirty degrees, forty-five degrees and ninety degrees of rotation. The driven member of a conveyor and such a motor moves in corresponding increments when the stepper motor is actuated by the conveyor control system.

However, precise positioning of a driven member is difficult to achieve with a stepper motor because positioning errors tend to be cumulative. Such errors may be the result of step deviations of a few degrees plus or minus. Also, errors can be caused by slippage or wear in the driven member or the drive mechanism and by overcoat of the driven member. Unless the conveyor control system is programmed to reset the driven member and the drive mechanism with respect to each other, the positioning errors cumulate so that the relative misposition increases with each incremental movement.

Furthermore, stepper motors powerful enough for material handling conveyors are relatively expensive compared to continuously driven motors. Reset mechanisms for solving the aforementioned cumulative positioning error problem also add to the cost and complexity of conveyors with stepper motors. Their relatively high cost is particularly disadvantageous in conveyor systems, such as automatic order filling systems, wherein large numbers of individual conveyors are employed.

In automatic order filling systems, orders are filled by collecting predetermined quantities of particular articles for ultimate delivery to customers. For dispensing the goods at precise intervals according to the requirements of each customer order, stepping conveyors with incremental movements may be employed to advantage. For example, each conveyor cycle may result in a predetermined number of specific articles being dispensed into a receptacle. The orders may be filled from a number of different articles each of which is dispensed by a separate, individually controlled conveyor. Furthermore, for some articles which are frequently required in multiples, it may be desirable to provide several conveyors each dispensing a different number of the articles per cycle.

However, heretofore there has not been available a relatively inexpensive, power-driven stepping conveyor capable of consistent, uniform incremental movements and especially well suited for automatic order filling systems.

SUMMARY OF THE INVENTION

In the practice of the present invention, a power-driven conveyor is provided which is particularly well adapted for use as a dispensing conveyor in an automatic order filling system. The order filling system disclosed herein is the subject of copending U.S. patent application, Ser. No. 509,295 now U.S. Pat. No. 4,542,808, which is assigned to a common assignee herewith.

The order filling system includes a central, continuously driven, endless belt conveyor with dispensing conveyors placed on both sides thereof for dispensing articles into receptacles on the central conveyor in response to commands from an order filling system controller. Orders are tracked by the controller as they move along the central conveyor. The dispensing conveyors are individually cycled and monitored by their respective control systems to dispense articles onto the central conveyor whereby orders are assembled.

Since each incremental movement of the dispensing conveyors causes one or more articles to drop into a receptacle on the central conveyor, the dispensing conveyor movements must be precisely regulated. Therefore, the drive mechanisms for the dispensing conveyors must effect uniform incremental movements so that each dispense command results in a driven member movement which is exactly sufficient to discharge an article or predetermined number of articles.

The conveyor of the present invention includes an endless belt with transverse cleats spaced at intervals equal to the incremental movements of the belt. The drive mechanism includes an actuator and a pawl mechanism. In the preferred embodiment of the invention, the actuator comprises a pneumatic cylinder with an extensible and retractible rod. A solenoid-actuated air valve is provided for selectively communicating pressurized air to the pneumatic cylinder.

A pawl mechanism is connected to the rod and includes a traveler slidable on a pusher track and an assembly of pivotally interconnected levers. In a push configuration the pawl mechanism engages a cleat on the endless belt so that as the rod extends the belt is advanced. On its retract stroke, the rod lowers the pawl mechanism to its retract configuration so that it clears the next cleat to be engaged. Since the length of the cylinder stroke is constant and the cleats are uniformly spaced, the belt is advanced in relatively precise increments whereby each cylinder stroke causes all of the articles between an adjacent pair of cleats to be discharged.

The principal objects of the present invention are: to provide a power-driven or live conveyor; to provide such a conveyor with a driven member comprising an endless belt; to provide such a conveyor wherein the belt is subdivided into compartments by transverse cleats; to provide such a conveyor for use as a dispensing conveyor in an order filling system; to provide such a conveyor with a drive mechanism; to provide such a conveyor wherein the drive mechanism is adapted to incrementally advancing the endless belt; to provide such a conveyor wherein the drive mechanism advances the endless belt in increments equal to the spacing of the cleats; to provide such a conveyor wherein the incremental advances of the endless belt are relatively unifom; to provide such a conveyor wherein discrepancies between the incremental advances of the endless belt are non-cumulative; to provide such a conveyor wherein the drive mechanism includes a pawl mechanism with a push configuration for engaging the cleats and a retract configuration disengaged from the cleats; to provide such a conveyor wherein the drive mechanism includes an actuator; to provide such a conveyor wherein the drive mechanism actuator comprises a pneumatic cylinder with an extensible and retractible rod; to provide such a conveyor wherein the drive mechanism is particularly well adapted for use in a plurality of conveyors operably connected to a common source of pressurized air; to provide such a conveyor wherein the drive mechanism is adapted for positive, selective engagement with the driven member; to provide such a conveyor wherein frictional resistance to movement of the belt is minimized; to provide such a conveyor which is particularly well adapted for dispensing items placed within its compartments; to provide such a conveyor with a drop detection sensor for detecting the discharge of an item therefrom; to provide such a conveyor which may be constructed with compartments of various sizes; to provide such a conveyor wherein the drive mechanism may be constructed with different stroke lengths corresponding to different spacings of cleats on respective endless belts; to provide such a conveyor which is efficient in operation, economical to manufacture, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary, perspective view of an order filling system with dispensing conveyors embodying the present invention.

FIG. 2a is a fragmentary, plan view of the order filling system.

FIG. 2b is a continuation of FIG. 2a showing a fragmentary, top plan view of the order filling system.

FIG. 3 is a transverse cross-sectional view of the order filling system taken generally along line 3—3 in FIG. 2a.

FIG. 4 is a fragmentary, top plan view of the order filling system.

FIG. 5 is a fragmentary, top plan view of the order filling system particularly showing two dispensing conveyors.

FIG. 6 is a longitudinal, cross-sectional view of a dispensing conveyor taken generally along lines 6—6 in FIG. 5.

FIG. 7 is a transverse, cross-sectional view of a dispensing conveyor taken generally along lines 7—7 in FIG. 6.

FIG. 8 is a perspective view of a pawl mechanism of a dispensing conveyor.

FIG. 9 is a side elevational view of the pawl mechanism in its retract configuration.

FIG. 10 is a side elevational view of the pawl mechanism in its push configuration.

FIG. 11 is a top plan view of the pawl mechanism.

DETAILED DESCRIPTION OF THE PREFERRED EMBODIMENT

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. Order Filling System

Referring to the drawings in more detail, a plurality of power-driven conveyors 20 embodying the present invention are shown employed as dispensing conveyors in an order filling system 1. The order filling system 1 includes a variable speed, endless belt-type central conveyor 2 upon which receptacles 3 are placed in end-to-end relation. A power-driven return conveyor 9 is positioned above the central belt conveyor 2 for returning the receptacles 3 to their starting position 13 at the head of the central belt conveyor 2. Alternatively, the return conveyor 9 may be positioned alongside and parallel to the central conveyor 2. Fluorescent light fixtures 14 are mounted beneath the return conveyor 9.

The conveyors 20 are adapted for dispensing articles 8 to the receptacles 3. The articles 8 may comprise, for example, different items of merchandise. The conveyors 20 are shown grouped into conveyor sections 4 according to their respective sizes, each conveyor section 4 including one size of conveyors 20. Alternatively, different sizes of conveyors 20 may be grouped into conveyor sections at random or according to some other criteria such as type of merchandise.

Each conveyor section 4 includes a respective support rack 5 on which conveyors 20 are mounted in juxtaposed relation. The support racks 5 in the order filling system 1 are of a standard size and are positioned at spaced intervals along either side of the central conveyor 2 with access aisles 6 therebetween. For example and without limitation, the support racks 5 may be 76 inches wide and 32½ inches high whereby attendants within the aisles 6 have access to all of the conveyors 20.

Merchandise stock racks 7 (FIG. 2b) are provided in proximity to respective conveyor sections 4. Cartons of the articles 8 are placed on the stock racks 7. Articles 8 are manually removed from their cartons and placed on conveyors 20 by the attendants of the order filling system 1.

A controller 10 for the order filling system 1 comprises a computer. The controller 10 communicates with a host computer, for example an IBM System 34, which compiles orders for the articles 8. A printer 12 is provided adjacent the controller 10 for printing the orders compiled by the host computer and indicating missing articles 8. An interface translator (not shown) is provided for converting the output of the host computer to a format readable by the controller 10 and vice versa.

An air compressor (not shown) is operably connected to the dispensing conveyors 20 and provides a common source of pressurized air therefor by means of supply lines 16 of an air pipe network. The air pipe network also includes discharge lines 17 for receiving air exhausted by the dispensing conveyors 20.

Each support rack 5 includes upstanding pairs of front and back angle-section, upright corner posts 21 and 22. Channel-section longitudinal members 23 extend between respective pairs of the front and back corner posts 21 and 22 at the sides 33 of the support rack 5.

Rack front and back upper crossmembers 24 and 25 are mounted on top of respective front and back corner posts 21 and 22 and extend transversely across storage rack front and back ends 31 and 32 respectively. Front and back lower crossmembers 26 and 27 are attached to the corresponding front and back corner posts 21 and 22 and extend transversely therebetween in parallel, vertically spaced relation to the rack upper crossmembers 24 and 25. The rack crossmembers 24, 25, 26 and 27 have channel-shaped cross-sectional configurations.

Upper and lower U-bolts 28 and 29 support the supply and discharge lines 16 and 17 respectively and are mounted on the front corner posts 21. A pair of angle-section diagonal braces 30 are attached at the rack sides 33 and 34 to respective back corner posts 22 and longitudinal members 23.

The conveyors 20 are substantially identical in construction and operation except for dimensional differences. Therefore, the following detailed description of a conveyor 20 applies to all of the conveyors 20 except as otherwise noted. The conveyor 20 generally comprises a bed assembly 35(II), a belt assembly 36(III), a drive mechanism 37(IV) and a control system 38(V).

II. Bed Assembly

The bed assembly 35 includes an elongated guide channel 40 integrally formed with an upper web 41, a pair of opposed, parallel, spaced side flanges 42 depending downwardly from the upper web 42 and a pair of opposed lower legs 43 extending inwardly from respective lower edges of side flanges 42 and terminating at free edges 44 positioned in opposed, parallel, spaced relation. An interior passage 45 is formed by the guide channel 40 and is open downwardly at a slot 46 defined by the lower leg free edges 44. The guide channel upper web 41 terminates at front and back edges 47 and 48 and the guide channel side flanges 42 terminate at front and back edges 49 and 50.

A pair of elongated side rail bands 51 are mounted on top of the guide channel upper web 41 in coplanar relation with respective guide channel side flanges 42. Opposite side walls 52 of the bed assembly 35 each includes a lower portion comprising a respective guide channel side flange 42 and an upper portion comprising a respective side rail band 51. The bed assembly side walls 52 include respective inner faces 53 in mutually opposed relation and respective outer faces 54. The side rail bands 51 are mounted on the guide channel 40 by a plurality of tabs 55 welded to the bed assembly side wall outer faces 54.

The bed assembly 35 terminates at opposite front and back ends 56 and 57 respectively. A back cover plate 58 is mounted on the bed back end 57 and includes a back cover plate flange 59 depending downwardly from the guide channel lower legs 43. An indicator light 60 is mounted on the back cover plate flange 59.

Front, middle and back bed crossmembers 61, 62 and 63 respectively extend transversely across the bed assembly 35 and are welded on the undersides of the guide channel lower legs 43. The front and middle crossmembers 61 and 62 comprise channel-sections and the back crossmember 63 comprises an angle-section.

The bed assembly 35 is clamped on the support rack 5 by angle-section mounting clips 64 which are bolted to the bed front and back crossmembers 61 and 63 by bolts 65 and nuts 66. The bolts 65 are positioned in aligned pairs of apertures in the bed front and back crossmembers 61 and 63 and in the mounting clips 64. As shown in FIG. 6, the rack front and back upper crossmembers 24 and 25 are clamped between the guide channel lower legs 43 and the mounting clips 64 by tightening the bolts 65.

A drop detector cover plate 75 extends transversely across the bed assembly front end 56 and is attached at its opposite ends to the bed assembly side walls 52. A pair of side plates 76 are each attached to a respective bed side wall outer face 54 and depend downwardly from the guide channel 40 slightly behind the bed assembly front end 56. The side plates 76 abut the front upper cross member 24 when the bed assembly 35 is properly positioned on the support rack 5.

III. Belt Assembly

The belt assembly 35 includes an endless belt 77 with inner and outer surfaces 78 and 79 respectively and opposite side edges 80. The endless belt 77 is trained over front and back pulleys 82 and 83 extending transversely across the bed assembly front and back ends 56 and 57 respectively. The pulleys 82 and 83 include axles 84 at their opposite ends. At least one of the axles 84 of each pulley 82 and 83 is threadably removable therefrom to facilitate installation of the pulleys 82 and 83 in the guide channel 40.

A pair of front mounting plates 90 are secured to the side wall outer faces 54 at the bed assembly front end 56 by suitable mechanical fasteners such as threaded studs 91 and nuts 92 as shown in FIG. 6. The front mounting plates 90 have axle apertures (not shown) aligned with apertures (also not shown) in the bed assembly side walls 52 for receiving the axles 84 of the front pulley 82.

A pair of back mounting plates 95 are placed against the side wall outer faces 54 at the bed assembly back end 57. The back mounting plates 95 are substantially identical to the front mounting plates 90 and include axle apertures (not shown). The bed assembly side walls 52 have elongated horizontal slots 96 at the bed back end 57. The back pulley axles 84 and threaded studs 91 are slidably received in respective elongated slots 96. The back mounting plates 95 are secured to the bed assembly side walls 52 by nuts 92 and washers 97 which are received on the studs 91.

The elongated slots 96 allow the back pulley 83 to be repositioned so that proper adjustment of the endless belt 81 is maintained. For example, excessive slack in the endless belt 81 may be taken up by loosening the nuts 92, moving the back pully 83 and the back mounting plates 95 rearwardly, and retightening the nuts 92.

A belt guide plate 111 is mounted on the guide channel upper flange 41 within the guide channel passage 45 by a hinge 112. The guide plate 111 includes a proximate section 113 attached to the hinge 112 and a distal section 114. The proximate and distal sections 113 and 114 form an obtuse dihedral angle with respect to each other. The plate distal section 114 is substantially horizontal and rests on the belt inner surface 78. Since the guide plate 111 is freely swingable about a pivotal axis extending transversely through the hinge 112, its weight is brought to bear against the belt inner surface 78.

A plurality of cleats 121 extend transversely across the belt 77 in evenly spaced relation and terminate at opposite ends 122 positioned in spaced relation outwardly from the respective belt side edges 80. Each cleat 121 has a parallelogram-shaped cross-sectional configuration and inner, outer, leading and trailing faces 123, 124, 125 and 126 respectively. The belt 77 and cleat trailing faces 126 form acute included angles "A" with respect to each other. Respective adjacent pairs of cleat leading and trailing faces 125 and 126 define compartments 131 therebetween which receive and separate the articles 8 placed on the belt outer surface 79. The compartments 131 are upwardly open in the upper part of their path of movement and downwardly open in the lower part thereof.

The cleats 121 are attached to the endless belt 77 by mechanical fasteners comprising, for example, nails 127 having relatively broad, flat heads 128 and shanks 129. Galvanized nails of a type commonly used for applying composition roofing shingles have been found to be particularly well adapted for this purpose. Each cleat 121 is attached by driving several nails in transverse spaced relation through the belt 77 whereby their shanks 129 are embedded in the cleats 121 and their heads 128 engage the belt inner surface 78. Preferably, the nails 127 are recessed so that their heads 128 slightly compress the belt 77 and are positioned below the plane of the belt inner surface 78. In this manner, interference between the nails 127 and the pulleys 82 and 83 is avoided.

The cleats 121 preferably comprise a material with a relatively low coefficient of friction to facilitate sliding contact with the bed assembly 35. For example, without limitation on the generality of useful materials, ultra high molecular weight (HMW) polyethylene has been found to be particularly well adapted for the cleats 121. HMW plastic has a relatively low coefficient of friction, is relatively strong, and may be nailed for attachment to the endless belt 77.

The belt assembly 36 is designed to minimize frictional drag with respect to the bed assembly 35. The sliding contact therebetween is limited to the HMW plastic cleats 121 sliding on the metal parts of the bed assembly 35 and the belt inner surface 78 sliding on the guide channel upper web 41 and the belt guide plate distal section 114.

The cleat ends 122 are positioned outwardly from the belt side edges 80 so that the cleats 121, but not the belt side edges 80, slidably engage the bed assembly side walls 52 whereby the belt 77 is maintained in proper alignment and centered with respect to the bed assembly 35. Also, the outer faces 124 of those cleats 121 positioned below the level of the pulleys 82 and 83 are in sliding engagement with the upper surfaces of the guide channel lower flanges 43. However, the frictional resistance to belt movement resulting from these sliding contacts is minimal because of the relatively low coefficient of friction between the HMW plastic of the cleats 121 and the steel parts of the bed assembly 35 and because of the relatively light pressures at the areas of sliding engagement.

IV. Drive Mechanism

Incremental movements of the belt 77 are accomplished by means of the drive mechanism 37 which is mounted on the bed assembly 35 and generally positioned therebeneath. A pusher track 141 includes a lower web 142, a pair of opposed side flanges 143 and a pair of upper legs 144 extending inwardly from the side flanges 143. The upper legs 144 include upper and lower faces 148 and 149 and terminate at opposed, parallel edges 145 defining a pusher track slot 146 therebetween. A pusher track passage 147 upwardly open at the slot 146 extends along the pusher track 141.

The pusher track 141 is mounted on the bed assembly 35 in spaced relation therebeneath by mounting bolts 155 inserted in mounting bolt apertures (not shown) in the front and middle crossmembers 61 and 62 respectively and in the slot 146. The mounting bolts 155 threadably receive nuts (also not shown) whereby the pusher channel upper leg upper faces 148 are clamped tightly against the crossmembers 61 and 62. With the pusher track 141 thus mounted, its slot 146 is longitudinally aligned with and in opposed relation to the guide channel slot 46.

A traveler 161 is slidably mounted on the pusher track 141 and has a body 162 with upper and lower faces 163 and 164, a pair of opposite side edges 165 and front and back ends 166 and 167. Attached to and depending from the body lower face 164 is a retainer 168 having an inverted T-shaped cross-sectional configuration. The retainer 168 includes a base 169 interconnected by a rib 170 with the body 162. A pair of outwardly open traveler slots 171 are formed between the traveler body lower face 164 and the retainer 168 and each receives a respective pusher track upper leg 144 whereby the rib 170 is positioned within the pusher slot 146 and the retainer base 169 is positioned within the pusher passage 147. A traveler block 176 is mounted on the traveler body upper face 163 and has front and back ends 177 and 178 in spaced relation from the traveler body front and back ends 166 and 167 respectively.

The aforementioned components of the traveler 161 preferably comprise high molecular weight (HMW) plastic to minimize frictional resistance to sliding movement between the traveler 161 and the pusher track 141. The body 162, the retainer 168 and the block 176 comprise discrete elements of the traveler 161 which are interconnected by traveler bolts 179 inserted in aligned apertures (not shown) through the traveler 161 and threadably receiving nuts (also not shown). Alternatively, the entire traveler 161 may be shaped from a single piece of material.

An actuator comprising a double-acting, fluid-actuated power cylinder 190 is mounted on the pusher track 141 by front and back cylinder mounting brackets 191 and 192 attached to cylinder front and back (relative to the conveyor 20) ends 196 and 197 repectively by bolts 198. The front cylinder mounting bracket 191 is attached to the pusher track 141 by a bolt 193 which extends through an aperture in the front cylinder mounting bracket 191 and the pusher track slot 146 and threadably receives a nut (not shown) in the pusher track passage 147.

The back cylinder mounting bracket 192 includes a tab 194 which extends through the pusher track slot 146 and is secured within the pusher track passage 147. The back cylinder mounting bracket 192 includes an arm 199 which extends rearwardly and is positioned to one side of and above the pusher track 141.

A bumper 205 comprising a strip of resilient material folded double is attached to the back cylinder mounting bracket 192. The bumper 205 cushions the impact of the traveler body front end 166 against the back cylinder mounting bracket 192 in the event the traveler 161 slides forwardly past its intended foremost stopping position on its retract stroke.

In the preferred embodiment of the present invention, the power cylinder 190 preferably comprises a double-acting pneumatic cylinder. Air fittings 200 are provided at the power cylinder front and back ends 196 and 197 respectively whereat pressurized air is admitted from air tubes 201 communicating with the fittings 200. A laterally extensible and retractible rod 202 extends from the cylinder back end 197 and terminates at a head 203 positioned over the traveler body upper face 163. The rod 202 is connected to a piston (not shown) within the power cylinder 190 which is reciprocable by pressurized air.

Interconnecting the traveler 161 and the cylinder rod head 203 is a lever assembly 210. The traveler 161 and the lever assembly 210 collectively comprise a pawl mechanism 160 which is slidably movably mounted on the pusher track 141. The lever assembly 210 includes paired first levers 211 and paired second levers 212.

Each first lever 211 includes a proximate end 215 pivotally connected to the cylinder rod head 203 by a respective bolt 216 and a distal end 221 with an aperture 222. The apertures 222 pivotally receive opposite ends 223 of a first pivot pin 224. The pivot pin opposite ends 223 project outwardly beyond the first levers 211 and receive cotter pins 225 for retaining the first lever distal ends 221.

A push plate 231 having front and back faces 232 and 233, a pair of side edges 234, and upper and lower edges 235 and 236 respectively is fixedly attached, for example by welding, on its front face 232 adjacent its upper edge 235 to the first pivot pin 224. The pivot pin opposite ends 223 project outwardly from the push plate side edges 234.

Each of the second levers 212 includes a proximate end 241 pivotally attached to the traveler body side edges 165 by a second pivot pin 242 extending transversely through a receiver (not shown) in the traveler body 162 slightly in front of the traveler back end 167. Opposite ends 245 of the second pivot pin 242 are positioned in receivers (also not shown) of the second lever proximate ends 241. A washer 246 with a flat 247 is welded to one of the second pivot pin opposite ends 245. The other second pivot pin opposite end 245 receives a cotter pin 248. A key 249 is welded to a respective second lever distal end 244 in engagement with the washer flat 247 so that relative rotation between the second pivot pin and the second levers is prevented. Instead, the second pivot pin 242 rotates within the receiver in the traveler body 162. Rotation of the metal second pivot pin 242 within the HMW plastic traveler body 162 is preferred over rotation within the metal second lever proximate ends 241 because the former is believed to be more wear resistant. Counterweights 243 are connected to the second lever proximate ends 241 in spaced relation rearwardly from a second lever pivotal axis through the second pivot pin 242.

Distal ends 244 of the second levers 212 are fixedly attached, as by welding, to respective push plate side edges 234 slightly beneath the pivotal axis through the first pivot pin 224. As shown in FIG. 9, the second levers 212 form an obtuse included angle "B" with respect to the push plate 231 and their distal ends 244 are positioned between the first lever distal ends 221.

A particular advantage to the placement of the drive mechanism 37 below the bed assembly 35 is that the widths of the conveyors 20 may be kept to a minimum. Thus, the overall widths of the conveyors 20 are only slightly greater than the widths of their respective compartments 131. Furthermore, the pneumatic cylinder 190 offers advantages of reliability, economy and efficiency of operation as compared to alternative drive mechanisms such as electric stepping motors and the like.

IV. Conveyor Control System

The conveyor control system 38 includes a logic circuit housed within an enclosure 251 mounted on the pusher track lower flange 142. The control system 38 communicates with the order filling system controller 10 by means of a communication bus 252. A power bus 253 connects each control system 38 to a common source of electrical power. Each individual dispensing conveyor 20 in the order filling system 1 includes an address decoder and is assigned a unique binary code or address which is programmed into its respective control system 38. Thus, signals generated by the controller 10 are available to each dispenser control mechanism 38 but are ignored by all except the particular one to which the message is directed. The address decoder enables portions of the logic circuit upon decoding the proper address code from the controller 10. The control system 38 logic circuit is operative to receive dispense command signals from the controller 10. Also, status signals indicating that a dispense cycle has been completed and that the conveyor 20 is ready to receive another dispense command are channelled from the dispenser 20 to the controller 10.

A solenoid-actuated air valve 255 is mounted on the pusher track lower flange 142. Inlet and outlet air tubes 259 and 260 communicate the air valve 255 with the air pipe network supply and return lines 16 and 17 respectively. A shut-off valve 261 is provided in the inlet air tube 259 for sealing the supply portion of the air pipe network 15 in the event the dispenser 20 is removed from service.

The control system 38 also includes means for monitoring the position of the traveler 161 including front and back permanent magnets 271 and 272 respectively positioned on one of the traveler body side edges 165 in proximity to the traveler body front and back ends 166 and 167 respectively. The magnets 271 and 272 are mounted on threaded shafts (not shown) which are screwed into threaded receivers (also not shown) in the traveler body 162. Locknuts 275 are received on the threaded shafts whereby the relative spacing of the magnets 271 and 272 from the traveler body 162 may be adjusted.

A traveler position switch means in the logic circuit is actuated by the magnets 271 and 272 and includes front and back Hall effect devices 282 and 283 respectively. The front Hall effect device 282 is mounted on the back cylinder mounting bracket arm 199. The back Hall effect device 283 is mounted on a forwardly extending arm 285 of a back Hall effect device mounting bracket 286 attached to the pusher track upper legs 144 by a mounting bolt 287. The Hall effect devices 282 and 283 include respective elements 284 (shown in phantom in FIG. 9) responsive to magnetic fields and positioned on the insides of respective arms 199 and 285. A position sensor (not shown) in the logic circuit is actuated by the Hall effect devices 282 and 283. The position sensor communicates traveler 161 position signals to the controller 10. Also, the position signals may be used within the dispenser control system 38 to control operation of the pneumatic cylinder 190 by actuating the solenoid of the air valve 255.

A drop detector 291 includes a photoelectric sensor (not shown) mounted within a photoelectric sensor mounting tube 293 on the drop detector cover plate 75. The mounting tube 293 is tilted forwardly from bottom-to-top and is open at a light aperture 294 in the drop detector cover plate 75.

An alternative placement for the logic circuit of the control system 38 is within the pusher track 141. For example, the pusher track 141 could have a downwardly open configuration whereby the logic circuit could be installed and accessed from underneath. The Hall effect devices 282 and 283 could be mounted on the logic circuit within the pusher track passage 147 and the magnets 271 and 272 could be mounted on the bottom of the traveler retainer base 169. The magnets 271 and 272 would thereby move into respective positions over the front and back Hall effect devices 282 and 283 respectively as the traveler 161 reciprocated between its foremost and rearmost positions. The aforementioned alternative construction offers the advantages of eliminating the enclosure 251, and enclosing the logic circuit of the control system 38, the magnets 271 and 272 and the Hall effect devices 282 and 283 within the pusher track 141 for protection Furthermore, wiring from the logic circuit to the communication and power busses 252 and 253 respectively, the air valve 255, the Hall effect devices 282 and 283 and the drop detector 291 could be concealed within the pusher track passage 147.

V. Operation

In operation, the articles 8 may be grouped according to types in the compartments 131 of respective conveyors 20. Each compartment 131 may contain either a single respective article 8 or a predetermined number of a given type of article 8.

In the order filling system 1, several respective conveyors 20 may be dedicated to one type of article 8. For example, each compartment 131 of a respective dispensing conveyor 20 may contain one each of the articles 8, the compartments 131 of another dispensing conveyor 20 may contain two each of the articles 8, and so on. The articles 8 may be transferred by attendants from the product storage racks 7 to the bed assembly back ends 57 and then to respective compartments 131.

The dispensing conveyor sections 4 may each contain dispensing conveyors 20 of all one size or, alternatively, each dispensing conveyor section 4 may contain dispensing conveyors 20 of different sizes.

With the power cylinder 190 in a retracted position and the pawl mechanism 160 in a retract configuration as shown in FIG. 9, the lever mechanism 210 assumes a lowered position with the pusher plate lower edge 236 resting on the traveler body upper face 163 in spaced relation in front of the traveler block front end 177. The air valve 255 is normally biased by a spring (not shown) to a first position whereat pressurized air is communicated by a respective air tube 201 to the cylinder back end 197 with the cylinder rod 202 in its retracted position.

When the dispenser control mechanism 38 detects a message from the controller 10 intended for the dispensing conveyor 20, the solenoid of the air valve 255 is actuated and moves the air valve 255 to a second position and pressurized air is communicated from the inlet air tube 259 to the cylinder front end 196 by a respective air tube 201. Simultaneously, the cylinder back end 197 is opened to the outlet air tube 260 and communicates therewith by way of a respective air tube 201 and the air valve 255. The cylinder rod 202 is thereby extended and exhaust air from the cylinder back 197 is vented to a respective air pipe return line 17 to be discharged at a remote location.

When the cylinder rod 202 is thus extended, the first and second pairs of levers 211 and 212 respectively pivot with respect to each other about a pivotal axis extending through the pivot pin 224 whereby the push plate 231 is raised to a position as shown in FIG. 10. The push plate upper edge 235 is thus positioned slightly below the belt outer surface 79. Adjacent the push plate upper edge 235 a line of contact 237 is formed with a respective cleat trailing face 126. The line of contact 237 is substantially closer to the cleat inner face 123 than the cleat outer face 124. Put another way, the push plate 231 strikes the cleat 121 relative high up on its traling face 126.

The extension stroke of the cylinder 190 is continuous for its entire length but is divided into two parts by operation of the pawl mechanism 160. In the first-occurring part, the first and second pairs of levers 211 and 212 fold with respect to each other. In the second part of the cylinder extension stroke, the traveler 161 is slid rearwardly on the pusher track 141 and the belt 77 is incrementally advanced. When the cylinder rod head 203 engages the traveler block front 177, the first and second pairs of levers 211 and 212 have already been folded with respect to each other and the push plate 231 is positioned within the guide channel slot 46 for contacting a cleat trailing face 126. As the traveler 161 is slid rearwardly by the cylinder 190 in the second part of the cylinder 190 extension stroke, contact between the push plate 231 and the cleat trailing face 126 is established at the contact line 237.

The force exerted by the power cylinder 190 to advance the belt 77 is optimized by the configuration of the cleats 121. Specifically, their parallelogram-shaped cross-sectional configurations and the bottom-to-top rearward slopes of the cleat trailing faces 126 cause the push plate 231 to be selectively captured in close proximity to the belt outer surface 79. Thus, a tendency of the cleats 121 to rotate in a clockwise direction as viewed in FIGS. 6, 9 and 10 and deform the belt 77 and a tendency of the push plate 231 to slide downwardly on the cleat trailing face 126 are minimized and the force of the second part of the cylinder 190 extension stroke is effectively utilized for advancing the belt 77. Also, the weight of the belt guide plate 111 tends to resist deformation of the belt 77 and maintain the cleat outer faces 124 in flat, sliding engagement with the belt channel lower flanges 43. Furthermore, as heretofore noted, the employment of high molecular weight (HMW) polyethylene for the cleats 121 minimizes frictional resistance to movement of the belt 77.

When the power cylinder 190 reaches its maximum extension as shown in FIG. 6, the belt 77 will have advanced a distance corresponding to the spacing between its cleats 121 plus a slight coast distance due to its inertia and an article 8 in the foremost upper compartment 131 will have been discharged from the dispensing conveyor bed front end 56.

In order to ensure that the paired levers 211 and 212 fold with respect to each during the first part of the extend stroke before the traveler 161 is advanced, the second levers 212 are provided with the counterweights 243 to facilitate the folding action of the levers 211 and 212 by exerting a downward force on the second lever proximate ends 241 whereby the second lever distal ends 244 are lifted. Furthermore, it has been found that initiating this folding action by pivoting the levers at their respective pivotal axes requires somewhat less force than initiating the sliding movement of the traveler 161 along the pusher track 141.

The upward folding of the lever pairs 211 and 212 is accomplished by positioning the pivotal axis extending through the first pivot pin 224 above the levels of the pivotal axes extending through the first lever proximate end bolts 216 and the second pivot pin 242. Said another way, the pivotal axis through the pivot pin 224 is over-center with respect to the other two pivotal axes which extend through the bolts 216 and through the second pivot pin 242.

The retract stroke of the power cylinder 190 is likewise continuous and divided into two parts. In the first part, the lever assembly 210 is folded downwardly from its raised position as shown in phantom in FIG. 6 to its lowered position. In the second part of the retract stroke, the traveler 161 is slid forwardly along the pusher track 141 to its foremost position as shown in FIG. 9. The downward folding of the lever assembly 210 requires less force than sliding the traveler block 176 along the pusher track 141. Therefore, the folding action of the lever assembly 210 occurs in the first part of the retract stroke before the sliding action of the traveler 161 in the second part of the retract stroke.

The drive mechanism 37 is designed to advance the belt assembly 36 in uniform increments each approximately equal to the spacing of the cleats 121. At the end of each extend stroke of the cylinder 190, the pawl mechanism 160 is left in the same rearmost position on the pusher track 141. Since the rod 202 of the cylinder 190 is fully extended on each extend stroke thereof, the rearmost position of the pusher assembly 160 deviates relatively little from stroke to stroke.

On the retract stroke of the cylinder 190, the pusher assembly 160 is slid to its foremost position on the pusher track 141. With the pawl mechanism 160 in its foremost position (FIG. 9), the push plate 231 is positioned in front of the next cleat 121 to be engaged. In fact, even at the end of the first part of the extend stroke the push plate is spaced slightly in front of a respective cleat 121 due to the coast of the belt 77. Thus, the second part of the extend stroke is slightly longer than the cleat spacing; its excess length accommodating deviations in the final, rearmost position of the pawl mechanism 160. Also, the overlap of the second part of the extend stroke accommodates slight variations in cleat spacing, stretching of the endless belt 77, play in the pawl mechanism 160 and inaccurate positioning of the belt assembly 36 or the drive mechanism 37.

With the cylinder rod 202 in its fully retracted position, the pawl mechanism 160 is in its retract configuration as shown in FIG. 9. In the first part of the extend stroke, the pawl mechanism 160 moves from its retract configuration to its push configuration as shown in FIG. 10. Throughout the second part of the power cylinder 190 extend stroke, the pawl mechanism 160 is in its push configuration. During the first part of the retract stroke of the cyllinder 190, the pawl mechanism 160 is moved from its push configuration (shown in phantom in FIG. 6) to its retract configuration (shown in solid lines in FIG. 6). Throughout the second part of the retract stroke, the pawl mechanism 160 is in its retract configuration. The cycle is completed when the rod 202 is fully retracted and the pawl mechanism 160 is in its retract configuration as shown in FIG. 9. When the pawl mechanism 160 is in its push configuration, the lever assembly 210 is raised for engaging a respective cleat 121. When the pusher assembly is in its retract configuration, the lever assembly 210 is lowered so that it will clear a respective cleat 121 in the second part of the retract stroke of the power cylinder 190.

The overlap of the extend stroke second part cooperates with the cleat spacing to cancel out or automatically adjust for positioning errors which might otherwise result from the aforementioned causes. Therefore, the average length of the incremental advances of the belt assembly 36 will practically equal the average spacing of the cleats 121. In fact, after a large number of cycles have been completed, the average belt 77 incremental advance length will almost exactly equal the average cleat 121 spacing.

In the dispensing conveyors 20, this self-correcting feature which results from the cooperation between the belt assembly 36 and the drive mechanism 37 ensures that a respective compartment 131 will dispense its contents on each cycle. Furthermore, positioning errors and deviations of the belt assembly 36 and the drive mechanism 37 with respect to each other are non-cumulative since they are cancelled out by the aforementioned operational features of the conveyor 20.

The operation of the conveyor 20 is monitored by the control system 38. Prior to the initiation of a cycle, a "ready" signal is communicated to the controller 10 which indicates that the pawl mechanism 160 is in its foremost position as detected by the front Hall effect device 282. When a dispense command is received by the control system 38, the solenoid of the air valve 255 is actuated and the air valve 255 moves to its second position. When the pawl mechanism 160 reaches its rearmost position, an "end-of stroke" signal is fed directly back to the control system 38 from the back Hall effect device 283. The "end-of-stroke" signal causes the control system 38 to deactivate the solenoid of the air valve 255 whereby the return spring (not shown) thereof biases the pneumatic valve 255 to its first position. With the valve 255 in its normal position, pressurized air is communicated to the cylinder back end 197, the cylinder front end 196 is exhausted, and a retract stroke of the drive mechanism 37 is initiated.

Preferably, a relatively high and constant level of illumination is maintained in the view of the drop detector 291 by the fluorescent lights 14 so that an article 8 dispensed from the conveyor 20 casts a shadow on the photoelectric sensor of the drop detector 291 whereby a "drop confirmation" signal is fed directly to the control system 38.

The control system 38 includes a sliding threshold system for the photoelectric sensor so that changes in available illumination are compensated for. Therefore, article 8 drops are detected through a range of available illumination.

It is to be understood that while certain forms of the present invention have been illustrated and described herein, it is not to be limited to the specific forms or arrangement of parts described and shown.

What is claimed and desired to secure by Letters Patent is as follows:

1. A power-driven conveyor, which comprises:
   (a) a bed assembly including:
      (1) opposite front and back ends;
      (2) a guide channel with an upper flange, a pair of opposite side flanges and a pair of lower flanges, each of said lower flanges terminating at a respective free edge defining a guide channel slot therebetween, and a guide channel passage extending through said guide channel, said guide channel passage being downwardly open at said guide channel slot;
      (3) said guide channel upper flange terminating at front and back ends spaced inwardly from said bed assembly front and back ends respectively; and
      (4) a pair of opposite side rail bands each mounted on said guide channel upper flange in coplanar relation with a respective guide channel side flange, each said side rail band forming a respective bed assembly side wall with a respective guide channel side flange;
   (b) a belt assembly including:
      (1) front and back pulleys extending across the bed assembly front and back ends respectively;
      (2) an endless belt with inner and outer faces and opposite side edges trained over said pulleys;
      (3) a plurality of cleats attached to said belt in substantially uniform, spaced relation and extending transversely thereacross, each said cleat including opposite ends projecting outwardly from said belt side edges and a cross-sectional configuration defining a parallelogram with inner, outer, leading and trailing faces each at a respective parallelogram side, each said cleat trailing face defining a respective acute included angle with respect to said belt; and
      (4) a guide plate hingedly mounted on said bed assembly and slidably engaging said endless belt inner face for biasing respective cleats against said guide channel lower flanges in sliding engagement therewith;
   (c) a pusher track including a lower flange, a pair of opposite side flanges, and a pair of upper flanges each terminating at a respective free edge, said pusher track edges defining a pusher track slot therebetween and said pusher track having a passage extending therethrough, said pusher track passage being upwardly open at said pusher track slot;
   (d) pusher track mounting means for mounting said pusher track on said guide channel in spaced relation therebeneath with said guide channel and said pusher track slots being longitudinally aligned in opposed relation;
   (e) a double-acting, pneumatic cylinder mounted on said pusher track and having front and back ends and an extensible and retractible rod projecting from said cylinder back end and terminating at a head;
   (f) a traveler longitudinally mounted on said pusher track and including:
      (1) a body with a lower face slidably positioned on said pusher track upper flanges, an upper face, opposite side edges and front and back ends;
      (2) a retainer depending downwardly from said traveler body and having a retainer base positioned within said pusher track passage and a rib interconnecting said retainer base and said traveler body and located within said pusher track slot;
      (3) a pair of outwardly open traveler slots between said traveler body lower face in said retainer base, each said slot slidably receiving a respective pusher track upper flange; and
      (4) a traveler block mounted on said traveler body upper face and having a front end spaced rearwardly from said traveler body front end; and
   (g) a lever assembly including:
      (1) a pair of first levers each having a proximate end pivotally connected to said rod head and a distal end;
      (2) a pair of second levers each having a proximate end pivotally connected to a respective traveler body side edge and a distal end;
      (3) a push plate pivotally connected to said first lever distal ends and attached to said second lever distal ends;
      (4) a pivotal axis extending through the connections between said first lever distal ends and said push plate which is positioned above a level of a pivotal axis extending through the connections between said rod head and said first lever proximate ends and above the level of a pivotal axis extending through the connections between said traveler body and said second lever proximate ends; and
      (5) a pair of counterweights each mounted on a respective second lever proximate end behind the pivotal axis through the connections between said traveler body side edges and said second lever proximate ends.

2. The conveyor according to claim 1 which includes:
   (a) an air valve for selectively admitting pressurized air to said cylinder front and back ends.

3. The conveyor according to claim 1 which includes:
   (a) front and back magnets mounted on said traveler front and back ends respectively; and
   (b) front and back Hall effect devices mounted on said pusher track, said front and back Hall effect devices being adjacent said front and back magnets respectively when said traveler is at its respective foremost and rearmost positions on said pusher track.

4. The conveyor according to claim 1 which includes:
   (a) a drop detector including a photoelectric sensor mounted on said bed assembly front end for detecting the discharge of an article from said conveyor.

5. The conveyor according to claim 1 wherein:
   (a) said cleats comprise high molecular weight plastic and are nailed to said endless belt.

6. The conveyor according to claim 1 which includes:
   (a) said actuator having an extend stroke with first and second parts;
   (b) said actuator having a retract stroke with first and second parts;
   (c) said pusher assembly moving from its retract configuration to its push configuration in said extend stroke first part;
   (d) said lever mechanism engaging a respective cleat, said pusher assembly sliding rearwardly on said pusher track in its push configuration and said belt being incrementally moved during said extend stroke second part;

(e) said pusher assembly moving from its push configuration to its retract configuration and said lever mechanism disengaging from said cleat during said retract stroke first part;

(f) said pusher assembly sliding fowardly on said pusher track in its retract configuration during said retract stroke second part; and (g) said lever mechanism being foldable from a raised position with said pusher assembly in its push configuration to a lowered position with said pusher assembly in its retract configuration.

7. A power-driven conveyor, which comprises:
(a) a bed assembly with front and back ends;
(b) a belt assembly including:
   (1) front and back pulleys extending transversely across the bed assembly front and back ends respectively;
   (2) an endless belt trained over said pulleys; and
   (3) a plurality of cleats attached to said belt in spaced relation extending transversely thereacross;
(c) a drive mechanism including:
   (1) a pusher track mounted on said bed assembly;
   (2) an actuator motor with an extensible and retractable rod;
   (3) a traveler slidably mounted on said pusher track;
   (4) a lever assembly interconnecting said actuator rod and said traveler; and
   (5) said traveler and said lever assembly comprising a pawl mechanism having a push configuration with said lever assembly engaging a respective cleat and a retract configuration with said lever assembly disengaged from said cleats; and
(d) a guide plate hingely mounted on said bed assembly above said drive mechanism and slidably engaging said endless belt for biasing said belt into engagement with said drive mechanism.

8. The conveyor according to claim 7, which includes:
(a) said lever assembly having a first lever with a proximate end pivotally connected to said rod and a distal end, a second lever having a proximate end pivotally connected to the traveler and a distal end, and a push plate pivotally connected to said first lever distal end and attached to said second lever distal end between said pivotal connections of said first and second lever proximate ends;
(b) each said cleat having an inclined trailing face forming an acute angle with said belt;
(c) said push plate engaging a respective cleat inclined face adjacent to said belt in its push configuration; and
(d) said guide plate being adapted to maintain said push plate in engagement with a respective cleat inclined face adjacent to said belt.

9. The conveyor according to claim 7 wherein said guide plate includes:
(a) a proximate section hingedly mounted on said bed assembly; and
(b) a distal section in substantially flat engagement with said endless belt.

10. The conveyor according to claim 7 which includes:
(a) said motor having an extend stroke with first and second parts;

(b) said motor having a retract stroke with first and second parts;

(c) said pawl mechanism moving from its retract configuration to its push configuration in said extend stroke first part;

(d) said lever assembly engaging a respective cleat, said pawl mechanism sliding rearwardly on said pusher track in its push configuration and said belt being incrementally moved during said extend stoke second part;

(e) said pawl mechanism moving from its push configuration to its retract configuration and said lever assembly disengaging from said cleat during said retract stroke first part;

(f) said pawl mechanism sliding forwardly on said pusher track in its retract configuration during said retract stroke second part; and (g) said lever assembly being foldable from a raised position with said pawl mechansim in its push configuration to a lowered position with said pawl mechanism in its retract configuration.

11. The conveyor according to claim 7 wherein said lever assembly includes:
(a) a pivotal axis extending through the connection between said first lever distal end and said push plate, said pivotal axis being positioned above a level of a pivotal axis extending through the connection between said rod and said first lever proximate end and above the level of a pivotal axis extending through the connection between said traveler and said second lever proximate end.

12. The conveyor according to claim 7 which includes:
(a) said bed assembly including opposite side walls;
(b) said belt having opposite side edges; and
(c) each said cleat having opposite ends projecting outwardly from said belt side edges and adapted for slidably engaging said bed assembly side walls whereby said belt assembly is aligned within said bed assembly and said belt side edges are spaced inwardly from said bed side walls.

13. The conveyor according to claim 7 wherein:
(a) each said cleat has a cross-sectional configuration defining a parallelogram and inner, outer, leading and trailing faces each at a respective parallelogram side; and
(b) each said cleat trailing face defines a respective acute included angle with said endless belt.

14. The conveyor according to claim 7 which includes:
(a) said motor comprising a double acting cylinder having front and back ends each adapted to receive pressurized fluid.

15. The conveyor according to claim 14 which includes:
(a) a fluid valve for selectively admitting pressurized fluid to said cylinder front and back ends.

16. The conveyor according to claim 7 which includes:
(a) said pusher track having a pusher track channel extending therethrough and a pusher track slot, said pusher track channel being open at said pusher track slot; and
(b) said traveler having:
   (1) a body; and
   (2) a retainer with a retainer base positioned within said pusher track passage and a retainer rib interconnecting said retainer base and said traveler body, said rib being located within said pusher track slot;

(3) said lever assembly being connected to said traveler body.

17. The conveyor according to claim 16 wherein said traveler includes:

(a) said traveler body having upper and lower faces;

(b) said traveler body lower face slidably engaging said pusher track; and (c) a traveler block mounted on said traveler body upper face, said rod selectively engaging said traveler block with said pawl mechanism in its push configuration.

18. The conveyor according to claim 7 wherein said lever assembly includes:

(a) a first lever with a proximate end pivotally connected to said rod and a distal end;

(b) a second lever having a proximate end pivotally connected to said traveler and a distal end; and (c) said push plate being pivotally connected to said first lever distal end and attached to said second lever distal end.

19. The conveyor according to claim 18 wherein said lever assembly includes:

(a) a pivotal axis extending through the connection between said first lever distal end and said push plate which is positioned above a level of a pivotal axis extending through the connection between said rod and said first lever proximate end and above the level of a pivotal axis extending through the connection between said traveler and said second lever proximate end.

20. The conveyor according to claim 18, which includes:

(a) said second lever proximate end extending beyond said pivotal connection to said traveler; and (b) a counterweight mounted on said second lever proximate end beyond said pivotal connection with said traveler, said counterweight being adapted to exert a lifting force on said second lever distal end.

21. The conveyor according to claim 7 which incudes:

(a) said traveler having front and back ends;

(b) front and back magnets mounted on said traveler front and back ends respectively; and (c) front and back Hall effect devices mounted on said pusher track, said front and back Hall effect devices being selectively adjacent said front and back magnets respectively when said traveler is at its respective foremost and rearmost positions on said pusher track.

22. The conveyor according to claim 7 which includes:

(a) a drop detector including a photoelectric sensor mounted on said bed assembly front end for detecting the discharge of an article from said conveyor.

23. The conveyor according to claim 7 wherein:

(a) said cleats comprise high molecular weight plastic.

24. The conveyor according to claim 7 which includes:

(a) said cleats being nailed to said endless belt.

25. The conveyor according to claim 7 which includes:

(a) said traveler comprising high molecular weight plastic.

26. A power-driven conveyor, which comprises:

(a) a bed assembly with front and back ends;

(b) a belt assembly including:

(1) front and back pulleys extending transversely across the bed assembly front and back ends respectively;

(2) an endless belt trained over said pulleys; and (3) a plurality of cleats attached to said belt in spaced relation and extending transversely thereacross, each said cleat having an inclined face forming an acute angle with said belt;

(c) a drive mechanism including:

(1) a pusher track mounted on said bed assembly;

(2) a fluid-actuated motor with an extensible and retractable rod with a rod head;

(3) a traveler slidably mounted on the pusher track;

(4) a lever assembly connected to said traveler and having a push plate;

(5) said traveler and said lever mechanism comprising a pawl mechanism having a push configuration with said push plate engaging a respective cleat inclined face adjacent to said belt and a retract configuration with said lever assembly disengaged from said cleats; and (d) said belt assembly having a guide plate hingedly mounted on said bed assembly above said drive mechanism and slidably engaging said endless belt for biasing said belt into engagement with said drive mechanism.

* * * * *